Patented Mar. 18, 1924.

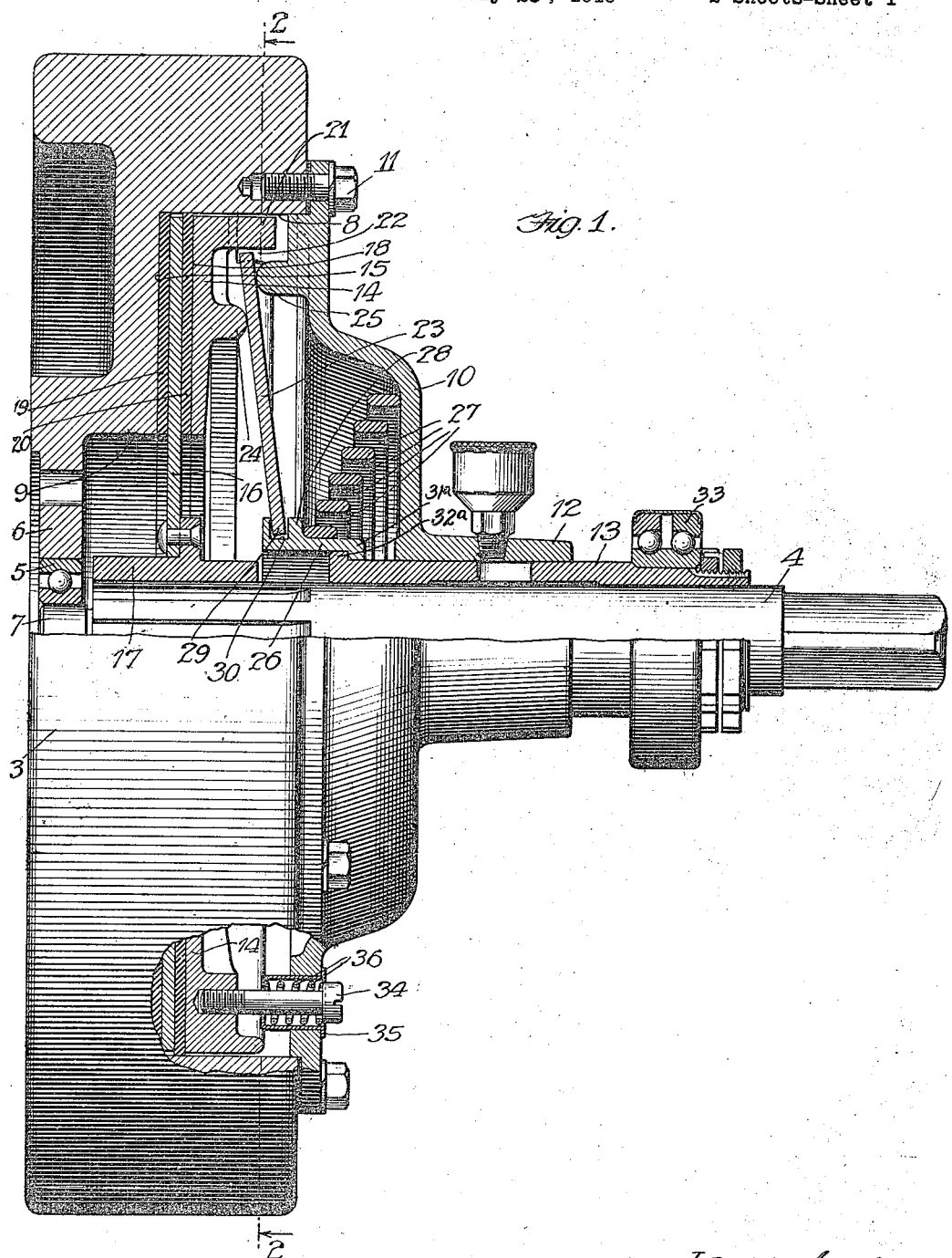

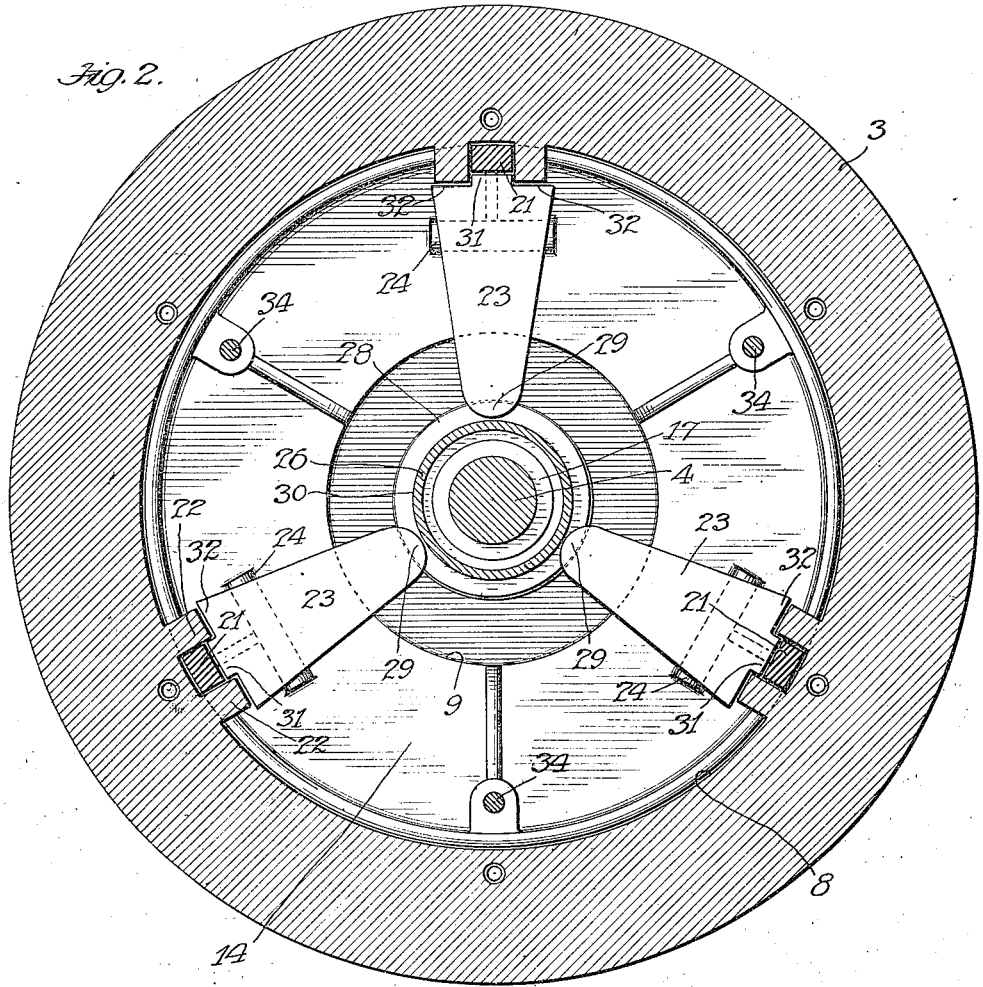
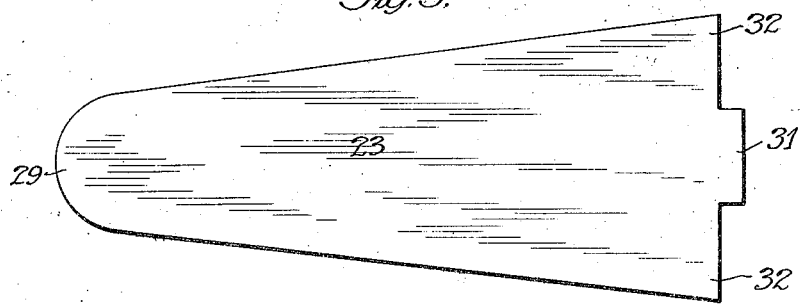

1,487,223

UNITED STATES PATENT OFFICE.

THOMAS L. FAWICK AND PERCY H. BATTEN, OF RACINE, WISCONSIN, ASSIGNORS TO TWIN DISC CLUTCH COMPANY, OF RACINE, WISCONSIN, A CORPORATION OF WISCONSIN.

CLUTCH.

Application filed July 26, 1919. Serial No. 313,720.

*To all whom it may concern:*

Be it known that we, THOMAS L. FAWICK and PERCY H. BATTEN, citizens of the United States, residing, respectively, at Racine, county of Racine, State of Wisconsin, and Racine, county of Racine, State of Wisconsin, have invented certain new and useful Improvements in Clutches, of which the following is a specification.

Our invention relates more particularly to clutches of the spring type, that is to say, clutches in which a spring normally maintains the clutch in engagement, means being provided for releasing the clutch at the will of the operator. The object of the invention is to produce a clutch of this type of relatively simple and inexpensive construction which shall be efficient in operation and easily maintained in order. In the drawings accompanying and forming a part of this application, we have disclosed a preferred form of clutch applied for operatively connecting a fly-wheel of an engine or the like to a shaft to be driven. It will be understood, however, that the clutch is of general application between two coaxial parts, one of which is to be driven from the other, and that the specific disclosure is for the purpose of exemplification only, the scope of the invention being defined in the following claims in which we have endeavored to distinguish it from the prior art so far as known to us without however relinquishing or abandoning any portion or feature thereof.

In the drawings Fig. 1 is a side elevation partly in diametrical section of a fly-wheel, shaft and clutch embodying our invention; Fig. 2 is a transverse section on the plane of the line 2—2 of Fig. 1 looking in the direction of the arrow; and Fig. 3 is an enlarged elevation of a detail.

Except in the respects hereinafter pointed out, the fly-wheel 3 and shaft 4 are or may be of usual construction, the coaxial relation between the two being maintained by the bearing 5 between the web 6 of the fly-wheel and the reduced end 7 of the shaft. The connection of the fly-wheel to the engine shaft is not shown. The wheel is chambered at 8 for the reception of a friction clutch element, the chamber being extended in an offset 9 of less diameter, both the chamber and offset being concentric with the fly-wheel and shaft. The chamber is closed by a cover plate 10 bolted to the rim of the wheel at 11 and formed with a hub 12 through which the shaft 4 above mentioned and the clutch operating sleeve 13, to be hereinafter more fully described, extend. A floating, axially adjustable friction clutch member 14 coacts with the annular shoulder 15 on the wheel to clamp between them the friction disk 16 through which the shaft is rotated. Said disc is riveted or otherwise secured to a collar 17 which is keyed upon the shaft to permit it to have a slight axial movement relative thereto. The shoulder 15 and the inner face 18 of the floating clutch member are faced with suitable friction material at 19 and 20, respectively. The floating clutch member is caused to revolve with the fly-wheel by lugs 21 formed at suitable intervals on said clutch member and extending between inwardly projecting lugs 22 upon the cover plate. Thus while the floating member is free to move toward and from the wheel, it revolves therewith.

The floating clutch member is normally forced into contact with the friction disc 16 by means of two or more levers 23 which bear against fulcra 24, 25 formed upon the floating clutch member and cover plate, respectively. Pressure is applied to the inner ends of said levers by an axially movable collar 26 and a spring 27, the latter being interposed between the cover plate and said collar and abutting at its inner end against an enlargement 28 upon the latter. As seen in Fig. 2, the levers 23, which may be stamped or otherwise formed out of sheet steel of sufficient strength and thickness, are rounded at their respective inner ends 29 to engage a groove 30 in the enlarged portion of collar 26, and said levers widen toward their outer ends where they are provided respectively with projecting tongues 31 which enter between the above mentioned lugs 22, the shoulders 32 on said levers limiting the outward movement thereof.

The collar 26 is formed at its outer or right-hand end, as viewed in Fig. 1, with an inwardly extending flange 31ª which surrounds the axially reciprocable sleeve 13 above mentioned, and said sleeve is formed on its inner or left-hand end with an outwardly extending flange 32ª, whereby when the sleeve is moved outwardly or to the right as viewed in Fig. 1, it carries the collar with it and thus releases the pressure of the levers against the floating clutch member.

The collar 33 is revolubly mounted upon the sleeve for connection to a lever or other suitable clutch operating means.

In order that the floating clutch member may separate from the friction disc 16 when the pressure on the levers is released, said clutch member is provided with a series of suitably spaced bolts 34 which extend through the bottoms of cups 35 secured in openings in the flange of the cover plate, there being springs 36 interposed between the heads of the stems and the bottoms of the cups to exert an outward pressure upon the stems and thereby withdraw the floating clutch member when the pressure of the levers is released.

The operation of the clutch is obvious and no separate description thereof is necessary. It will be noted, however, that in assembling a clutch embodying our invention there is not the usual difficulty of fitting the levers but they may be merely dropped into position before the cover plate is put on.

We claim:

1. In a device of the class described, a chambered driving part having an annular friction surface, a cover plate closing the open side of said chamber, a shaft extending through the cover plate, a friction disc secured to the shaft, an axially movable clamping member between which and the friction surface of the chambered driving part the friction disc is clamped, means for causing the clamping member to rotate with the driving part but permitting axial movement with respect to the latter, rounded fulcra arranged in pairs on the clamping member and cover respectively, the fulcrum of each pair on the clamping disc being nearer the shaft than that on the cover, radial levers engaging the fulcra with a rolling contact, a sleeve engaging the inner ends of the levers, and a spring intermediate said sleeve and the cover.

2. In a device of the class described, a chambered driving member having an annular friction surface and a member axially movable with respect to said friction surface, a friction disc extending between said members and arranged to be clamped thereby, a driven shaft on which said friction disc is splined, a cover plate secured to said driving part, pairs of lugs on the cover plate extending inwardly therefrom adjacent the periphery thereof, lugs on the axially movable member projecting respectively between the pairs of lugs on the cover plate, fulcra in radial alignment with the respective lugs on the axially movable member, fulcra on the cover plate in radial alignment respectively with the pairs of lugs thereon, levers each engaging a fulcrum on the axially movable member, and a fulcrum on the cover plate respectively, said levers formed at their outer ends respectively with shoulders 32 and intermediate tongues 31, said levers loosely engaging and rolling upon said fulcra, and an axially adjustable collar engaging the inner ends of said levers for operating them.

3. In a device of the class described, a driving and a driven part co-axially arranged, one of said parts having an axially movable clutch member and an axially immovable clutch member and the other of said parts having a friction disc intermediate said movable and immovable clutch members, a series of fulcra on the movable clutch member, corresponding fulcra on the axially immovable clutch member, a series of levers engaging corresponding fulcra on the axially movable and immovable clutch members, said levers having plane surfaces engaging the fulcra and rolling thereon.

4. In a clutch, a driving and a driven part co-axially arranged, one of said parts having an axially movable clutch member and an axially immovable clutch member, and the other of said parts having a friction disc arranged intermediate the said movable and immovable clutch members, said movable and immovable clutch members provided with rounded fulcra arranged in cooperating pairs, the members of each pair being on the movable and immovable members, respectively, and plane surfaced levers engaging said fulcra and extending between the same toward their outer ends and a sleeve engaging the inner ends of said levers, for operating the same.

THOS. L. FAWICK.
PERCY H. BATTEN.